United States Patent [19]

Hayafune

[11] Patent Number: 5,301,035
[45] Date of Patent: Apr. 5, 1994

[54] FACSIMILE APPARATUS HAVING REDIALING FUNCTION

[75] Inventor: Takeshi Hayafune, Hiratsuka, Japan

[73] Assignee: Ricoh Company, Ltd., Tokyo, Japan

[21] Appl. No.: 817,324

[22] Filed: Jan. 6, 1992

[30] Foreign Application Priority Data

Jan. 11, 1991 [JP] Japan .................. 3-012591

[51] Int. Cl.$^5$ .............................. H04N 1/00
[52] U.S. Cl. .................. 358/440; 358/403; 358/404; 358/407; 358/438; 379/142
[58] Field of Search ............... 358/400, 401, 402, 403, 358/404, 405, 406, 407, 434, 435, 436, 438, 439, 440; 379/100, 142

[56] References Cited

U.S. PATENT DOCUMENTS 5,134,653 7/1992 Satomi et al. .................. 379/142

FOREIGN PATENT DOCUMENTS

| | | | |
|---|---|---|---|
| 60-116285A | 6/1985 | Japan | 358/439 |
| 60-119169A | 6/1985 | Japan | 379/100 |
| 61-6976A | 1/1986 | Japan | 358/440 |
| 1-198163A | 9/1989 | Japan | 358/439 |

Primary Examiner—Edward L. Coles, Sr.
Assistant Examiner—Jerome Grant, II
Attorney, Agent, or Firm—Oblon, Spivak, McClelland, Maier & Neustadt

[57] ABSTRACT

The facsimile apparatus stores other party station discrimination information for reception so that there is a correspondence with the received telephone number in cases where a telephone number of a transmission destination is input and normal transmission performed. Furthermore, when there is redial transmission the facsimile apparatus displays the stored other party discrimination information on the display apparatus. Therefore, the task of selecting the other party destination is simplified for the operator.

10 Claims, 4 Drawing Sheets

| DISCRIMIN-ATING CODE | TELEPHONE NUMBER | DISPLAY DATA (CSI/RTI) | ABBREVIATED PROTOCOL DATA (DIS/NSF) | 8a |
|---|---|---|---|---|
| #1 | XX-XXX-XXXX | XXXXXXXX | XXXXXXXX | |
| #2 | XX-XXX-XXXX | XXXXXXXX | XXXXXXXX | |
| #10 | XX-XXX-XXXX | XXXXXXXX | XXXXXXXX | |

| ORDER | DISCRIMINATING CODE | 8b |
|---|---|---|
| 1 | (#5) | |
| 2 | (#1) | |
| 10 | (#3) | |

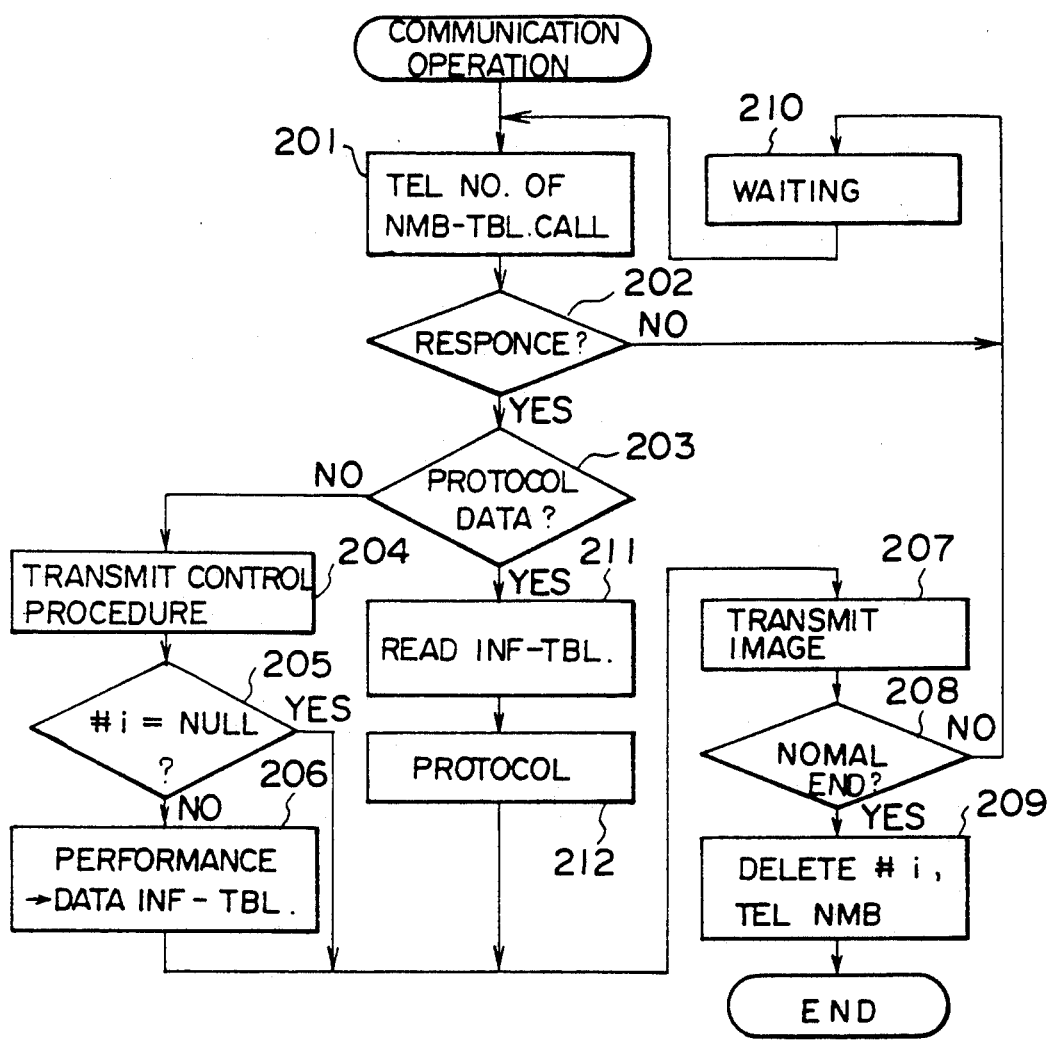

FACSIMILE APPARATUS HAVING REDIALING FUNCTION

BACKGROUND OF THE INVENTION

The present invention relates to a facsimile apparatus and more particularly, to a facsimile apparatus having a redialing function.

The transmission functions of the facsimile apparatus are single-button dialing (one-touch dial) that can transmit a data signal to a required destination through the operation of a single key, and an abbreviated dialing function that can transmit to a required destination through the input of an abbreviated number. In general, the facsimile apparatuses receive the names and other information, from another party, by certain normal transmission control procedures. These normal transmission control procedures are implemented as follows.

First in normal transmission control procedures, the facsimile apparatus receives DIS (Digital Identification Signals) and CSI(Called Subscriber Identification) signals from a transmission destination. Secondly, the facsimile apparatus sends DCS(Digital Command Signals) and TSI(Transmitting Subscriber Information) signals to a transmission destination. Thirdly, the facsimile apparatus receives NSF(Non-standard Facilities) signals from the transmission destination. Fourthly, the facsimile apparatus sends NSS (Non-standard Set-up) signals to the transmission destination. The facsimile apparatus executes modem training procedures, and determines the data transmission speed when the facsimile transmits image information to the transmission destination.

The above described CSI signals from the transmission destination which notifies the telephone number information of the transmission destination to the other party. The name and other information of the other party which are notified by the RTI(Remote Terminal Identification) information of the NSF signals of the transmission destination. Information other than the DIS signals and the NSF signals with the transmission destination notifies the facsimile apparatus of the communication performance information with the transmission destination apparatus.

Furthermore, the facsimile apparatus checks the apparatus communication performance of the other party station. Then the facsimile apparatus displays the received name on the display of the facsimile apparatus and transmits image signals that are suited to the apparatus communication performance of the apparatus of the checked communications destination.

When a facsimile apparatus performs transmission indicated by one-touch dial or abbreviated dialing, there is a function that stores the name and apparatus performance of the receiving side so that it corresponds with the one-touch dial or abbreviated dialing function of the facsimile apparatus. When the facsimile apparatus performs the same operation the next time, as instructed by the operator, the facsimile apparatus displays the name of the transmission destination on the display, as stored. Also, there is a function whereby after the facsimile apparatus has transmitted to the transmission destination, the stored apparatus performance of the other party station is used as the basis for shortening the transmission control procedures that check the apparatus performance of the other party station; when the operator specifies the other party station, transmission of the image signals is performed soon after the start button is pressed. Such transmission is called abbreviated protocol.

In addition, a redialing function is a function whereby after one transmission has been performed by input of a telephone number, pressing the redialing button transmits to the same transmission destination. However, with a conventional facsimile apparatus, when transmission using this redialing function is performed, it is not possible for the name of the received transmission destination used previously to be displayed on the display, for there to be transmission by abbreviated protocol. Only the telephone number of the transmission destination previously received by the facsimile apparatus is displayed. Accordingly, it is necessary for the operator to select the transmission destination from the telephone numbers displayed. There are therefore problems in that it is not easy for the operator to select the transmission destination, and it is not possible to perform efficient facsimile communication in a short time.

SUMMARY OF THE INVENTION

Accordingly a general object of the present invention is to provide a novel and effective facsimile apparatus that eliminates the problems described for the above conventional art.

A more specific object of the present invention is to provide a facsimile apparatus comprising:

input means for inputting a telephone number of a transmission destination;

transmission means for transmitting a data signal to the transmission destination of the telephone number input by the input means;

receiving means for receiving procedure signals having a discrimination information of the transmission destination through transmission control procedures with the transmission destination;

redialing information storage means for storing, in correspondance with the telephone number, the discrimination information which has been received from the transmission destination each time of transmission;

display means for displaying the discrimination information stored by the redialing information storage means;

redial selecting means for selecting one out of a plurality of the discrimination informations displayed on the display means;

redialing transmission means for transmitting the data signal to the transmission destination corresponding to the descrimination information selected by the redial selecting means.

These objectives can be attained by a facsimile apparatus comprising:

input means for inputting a telephone number of a transmission destination;

transmission means for transmitting a data signal to the transmission destination of the telephone number input by the input means;

performance judgment means for judging an apparatus performance of the transmission destination through transmission control procedures with the transmission destination;

redialing information storage means for storing, in correspondence with the telephone number, the apparatus performance information judged by the performance judgment means each time of transmission;

redial selecting means for selecting out one of a plurality of the discrimination informations stored in the redialing information storage means;

redialing transmission means for transmitting the data signal to the transmission destination corresponding to the descrimination information selected by the redial selecting means;

means for performing an abbreviated protocol for transmitting the data signal to the transmission destination without performing transmission control procedures for checking an apparatus performance information of the transmission destination stored in the redaialing information storage means.

BRIEF DESCRIPTION OF THE DRAWINGS

FIG. 6 is a flow chart of the communication operation according to the present invention.

DESCRIPTION OF THE PREFERRED EMBODIMENTS

The following is a description of the preferred embodiments, with reference of the appended drawings.

Figure 1:
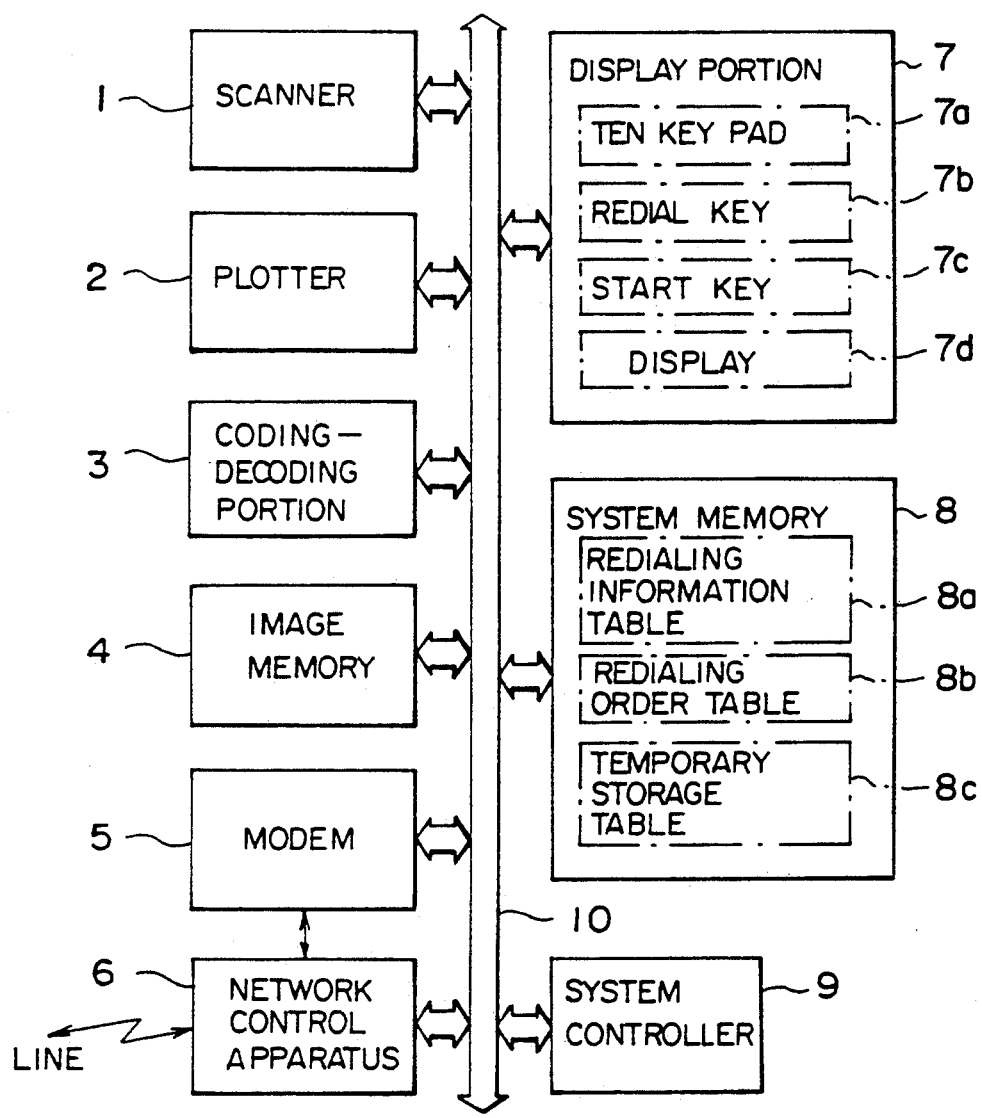
FIG. 1 is a block diagram of the configuration of a facsimile apparatus according to the present invention.

FIG. 1 shows the configuration of a facsimile apparatus of one embodiment of the present invention. A scanner 1 reads an original image and inputs to a plotter 2. A plotter 2 stores the received image from the scanner 1 on recording paper.

A coding-decoding portion 3 performs data compression and coding of the image information for transmission and also performs decoding of the received image information into the original image information.

An image memory 4 temporarily stores images for transmission and images received. A modem 5 modulates and demodulates image information and transmits it, the modem 5 also sends and receives each of various kinds of the procedure signals for the transmission control procedures. A network control apparatus 6 connects to a telephone line and performs required line control when there is transmitting and receiving.

An operation and display portion 7 displays the operation status of the facsimile apparatus and is also used by the operator to perform various operations. This operation and display portion 7 has a ten-key pad 7a that generates telephone numbers, a redial key 7b that performs redialing operation, a start key 7c that starts communications operation, and a display 7d that displays each of the types of character information.

A system memory 8 has a dialing information table 8a, an order table 8b and a communications destination number temporary storage table 8c; the system memory 8 stores the information necessary for communications operation.

A system control portion 9 is a microcomputer that controls each of the above portions. A system bus 10 is a data signal line that is used to perform signal transactions between each portion.

Figures 2, 3, 4:
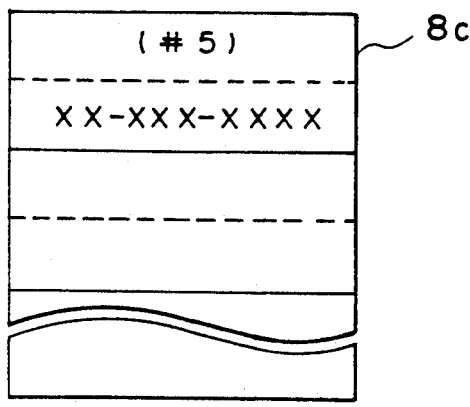
FIG. 2 is a view showing the stored information of a redial information table according to the present invention.
FIG. 3 is a view showing the stored information of an order table according to the present invention.
FIG. 4 is a view showing the stored information of a temporary storage table of transmittion destination numbers according to the present invention.

The following is a detailed description of the system memory 8 of the configuration described above. As shown in FIG. 2, the redialing information table 8a of the system memory 8 respectively stores the transmission destination telephone number, the data for display and the abbreviated protocol data so as to correspond to the discrimination codes #1 through #10.

The display data shown in FIG. 2 are the telephone numbers of destinations received by CSI(Called Subscriber Identification) signals of the communication control procedure, or RTI(Remote Terminal Identification) signals indicating the name of the other party facsimile station by NSF(Non-Standard Facsimile Command) signals. The data for the abbreviated protocol is information that indicates the apparatus performance of each of the communications destinations. In addition, the data for the abbreviated protocol includes the recording paper width, the recording line density, and the optimum value for the data transmission speed for receiving from the communication destination by the NSF signal or the DIS signal. This data for the abbreviated protocol includes other information such as the data transmission speed for actual transmission.

The redialing order table 8b of the system memory 8 orders discrimination codes used to #1 through #10 as shown in FIG. 3, it is a set order read out telephone numbers and data from the redialing information table 8a when redialing operation is performed.

As shown in FIG. 4, the communications destination number temporary storage table 8c of the system memory 8 performs redialing operation to select for each redialing operation as shown in FIG. 4, and temporarily store a discrimination number corresponding to a telephone number for transmission. When a facsimile apparatus actually performs transmission operation, the communications destination number temporary storage table 8c sets the called telephone number and the discrimination information as a pair, and erases this information when the facsimile communications are completed. In addition, that stored information is preserved, even if there has been no response from a communications destination that has been called once, when there has been a communications error after the start of communications and until the completion of facsimile communications after repeated call operation. On the other hand, the telephone numbers of each transmission destination information are stored, as a plurality of sets, when transmission to a plurality transmission destinations is not completed.

Figure 5:
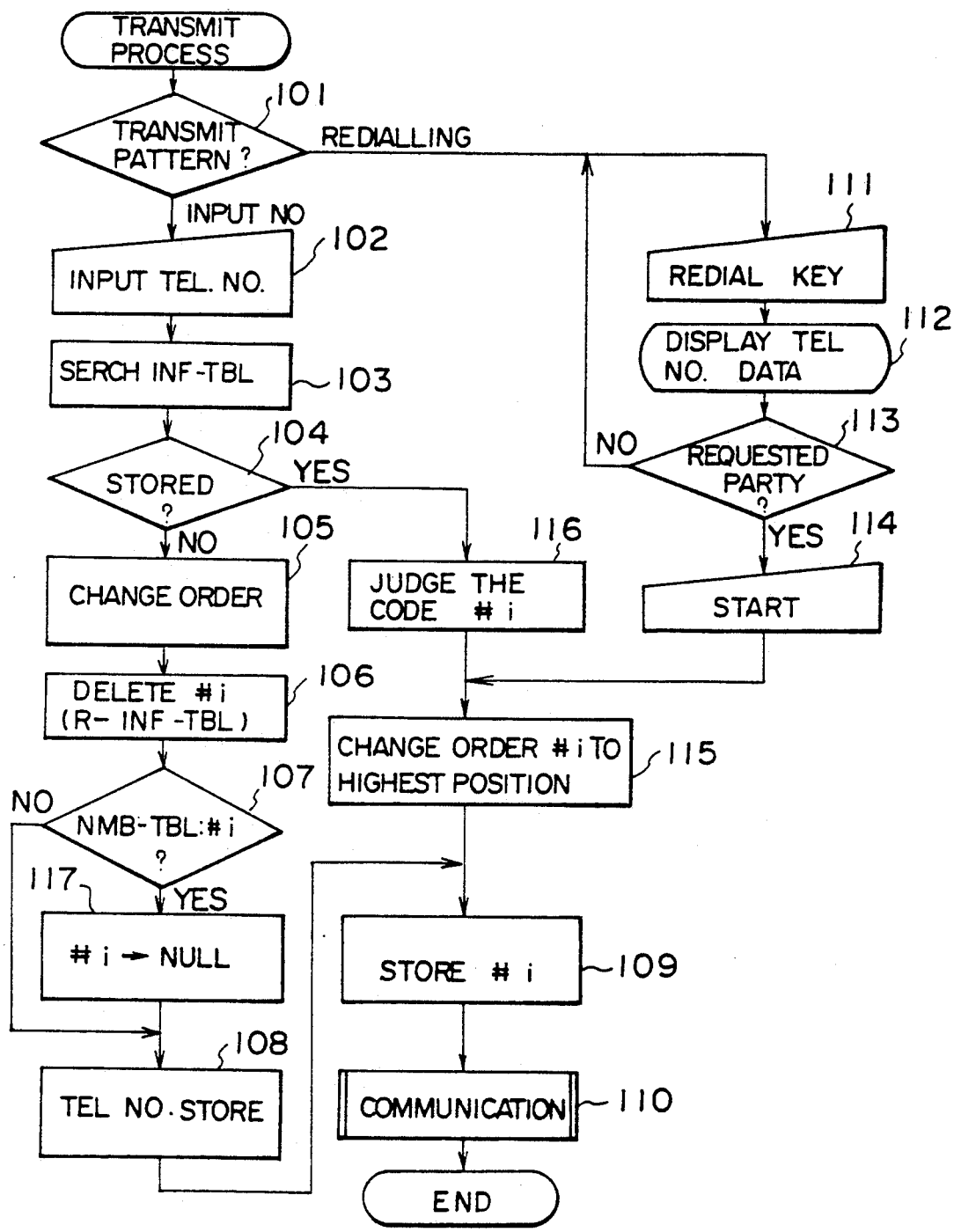
FIG. 5 is a flow chart of the operation of transmission processing according to the present invention.

In the following it is assumed that a facsimile apparatus having the configuration described above has completed transmission to more than ten current communications destinations. The telephone numbers of each of the transmission destinations, the display data and the abbreviated protocol data from the communications immediately prior to the communications prior to the tenth and are stored in the memory 8 so as to correspond to each of the discrimination codes #1 through #10 in order of reception. As an example, an operator transmits to a communications destination for image transmission. When this is done, as shown in FIG. 5, the operator either performs transmission, or decides to perform redialing transmission (step 101). More specifically, the facsimile apparatus performs redialing transmission when the operator selects a communications destination corresponding to one of the 10 prior communications and which are stored in the redialing information table 8a.

On the other hand, in step 101, when the operator performs operation of the ten-key pad 7a, of the operation and display portion 7, so as to input a telephone number, the telephone number of that communications destination is input and the start key 7c is then pressed (step 102). The facsimile apparatus starts when the start key 7c is pressed, and the dialing information table 8a is searched (step 103) for the telephone number that has been input from the ten key pad 7a. The facsimile apparatus then judges (step 104) whether or not the input telephone number is stored in the dialing information table 8a, and if the input telephone number is not stored (NO of step 104), then the lowest positioned identification code registered in the order table 8b shifts to the highest position. However, if the telephone number is registered in the order table 8b, each of the discrimination codes from the first through the ninth position are reordered so that they are shifted one step downwards (step 105). After the reordering of the identification codes of the order table 8b, the telephone number, display data, and the abbreviated protocol data inside the dialing information table 8a corresponding to the discrimination code #i prior to reordering, are respectively erased (step 106).

After this, a check is made of the communications destination number temporary storage table 8c to check that there is no data stored for discrimination code #i. If there is no discrimination code #i stored in the communications destination number temporary storage table 8c (No of step 107), then the redialing information table 8a stores the telephone number that has been input this time, so as to correspond to the discrimination code #i (step 108). Furthermore, the communications destination number temporary storage table 8c stores that telephone number and the discrimination code #i so that they correspond (step 109). After this, the facsimile apparatus executes required communications operation.

The following is a description of the required communications operation of the facsimile apparatus.

FIG. 6 shows the communications operation of a facsimile apparatus. The facsimile apparatus calls a telephone number set in the communications destination number temporary storage table 8c (step 201). The facsimile apparatus then monitors a signal from the communications destination (step 202) until the communications destination responds. Then the communications destinations responds (YES in step 202). The facsimile apparatus then reads a discrimination code #i that is stored along with the telephone number and performs a check for the presence of abbreviated protocol data inside the redialing information table 8a, which data corresponds to the discrimination code #i (step 203). If there is no abbreviated protocol data in the redialing information table 8a, then the communications destination corresponding to the discrimination code is a new communications destination to which communications have not been performed before. In this case, the facsimile apparatus executes normal transmission control procedures (NO, in step 203). The normal transmission control procedures are the same as those used for the conventional method.

After that, the facsimile apparatus executes modem training procedures, and determines the data transmission speed for when the image information is transmitted (step 204).

The facsimile apparatus judges whether a discrimination code corresponding to the telephone number of the communications destination in the communications destination number temporary storage table 8c of the system memory 8 is a NULL code or other code (step 205). This NULL code is set in the communications destination number temporary storage table 8c when a discrimination code corresponding to the telephone number is not registered. The discrimination code #i is set in the communications destination number temporary storage table 8c in the system memory 8, and the facsimile apparatus operates as described below when the discrimination code is not the NULL code (No of step 205). The facsimile apparatus stores the name and the telephone number of the other party station in the redialing information table 8a so as to correspond to the discrimination code #i of the communications destination number temporary storage table 8c.

Furthermore, the facsimile apparatus stores (step 206) the apparatus performance information, data transmission speed, and the other such information of the communications destination in the redialing information table 8a as abbreviated protocol data.

After this processing has been completed, the facsimile apparatus transmits to the communications destination the original image that has been set in the scanner 1, or reads the original image that has been stored beforehand in the image memory 4 (step 207). After the completion of transmission, the facsimile apparatus makes a judgment (step 208) on the results of the communications. The facsimile apparatus then erases the telephone number and the discrimination code of the communications destination of the previous transmission (step 209).

On the other hand, if there has been a communications error during transmission, the facsimile apparatus temporarily stops communications. In cases where the transmission has not been successful (NO in step 208), the facsimile apparatus repeats communication operation (step 201) after a short wait (step 210). In addition, also in cases where the communications destination has been called and does not respond (No in step 202), the facsimile apparatus repeats communications operation after a short wait.

By the operation described above, a telephone number, display data and abbreviated protocol data for the communications destination are successively stored in the redialing information table 8a each time there is transmission.

The following is a description of redial transmission.

First, the operator presses the redial key 7b of the facsimile apparatus (step 111 in FIG. 5). When the redial key 7b is pressed, the facsimile apparatus reads the display data and the telephone number in the redialing information table 8a in accordance with the order indicated by the order table 8b and displays it on the display 7d (step 112). When the RTI (Remote Terminal Identification) information is stored, the communications destination telephone number and the communication name is displayed on the display 7d. If the communications destination displayed on the display 7d is not the required transmission destination (No in step 313), the operator presses the redial key 7b until there appears on the display the required communications destination (step 111). At this time, the display 7d displays the communications destinations one by one on the display 7d each time the redial key 7b is pressed by the operator, until the required transmission destination is displayed. The operator observes the display of communications destination on the display 7d, and if the required transmission destination is displayed (YES of step 113), presses the start key 7c (step 114).

For example, when the communications destination corresponds with the discrimination code #i, the facsimile apparatus reorders the discrimination code #i of the order table 8b so as to place it at the highest priority position (step 115). Then, the discrimination code #i and the telephone number that corresponds to the discrimination code #i of the redialing information table 8a are stored in the communications destination number temporary storage table 8c (step 109). Normal communications operation is performed (step 110) when this processing has been completed.

In step 309 of the process described above, the abbreviated protocol data that corresponds to the discrimination code #i is stored in the redialing information table 8a. In the communications operation of step 110, the abbreviated protocol data is read, transmission control is performed.

More specifically, when the abbreviated protocol transmission control is originally performed, the facsimile apparatus sends the procedure signal that declares the start of the abbreviated protocol to the transmission destination, and soon after begins the transmission of the image signals. Then, the modem training procedures and transmission of procedure signals such as DIS, CSI, NSF, NSS and TSI signal are omitted. Therefore, the facsimile apparatus can send to the transmission destination image in a short time when there is redial transmission.

On the other hand, when the operator inputs a telephone number from the ten key pad 7a, and that input telephone number is stored in the redialing information table 8a (step 104 of FIG. 5), the discrimination code corresponding to that telephone number is judged (step 116). If the discrimination code is #i, then the facsimile apparatus operates in the same manner as that described above, with respect to the discrimination code #i (go to step 109).

Accordingly, when the facsimile apparatus transmits to the same communication destination for up to the past ten transmission even if a telephone number is input and normal transmission is performed, it is possible for the facsimile to execute the abbreviated protocol in the same manner as in the above mentioned redial transmission.

In addition, for example, the facsimile apparatus sometimes is used to transmit a plural number of the same original images stored in the image memory 4, to the transmission destination, there are cases where the facsimile apparatus must repeatedly perform the above described transmission operation with respect to a plural number of transmission destinations. In this case, a plural number of transmission telephone numbers that have been set are stored in the communications destination number temporary storage table 8c of the facsimile apparatus. When the facsimile apparatus stores a new telephone number that has been input by the operator, the old telephone number corresponding to the one of the discrimination codes #i in the redialing information table 8a is erased. When this is done, there are cases where the discrimination code #i of the redial information table 8a is indicated inside the communications destination number temporary storage table 8c. Therefore, when the discrimination code #i which stores information in the communications destination number temporary storage table has been erased (YES of step 107 of FIG. 5) the discrimination code #i is rewritten as the NULL code to indicate that there is no corresponding information for the discrimination code #i inside the communications destination number temporary storage table 8c.

Accordingly, even if the redialing information table 8a only has a storage area for 10 items, it is possible for the storage area to always store correct new information.

In addition the telephone numbers, display data and abbreviated protocol data can be stored for only the number of transmission other party destinations for which redial is possible. Accordingly the facsimile apparatus does not necessarily have a large memory.

Moreover, in the embodiment described above, the facsimile apparatuses are provided with a redialing information table 8a, an order table 8b, and a communications destination number temporary storage table 8c. With the present embodiment, the respectively stored information is made to correspond to discrimination codes in the information tables 8a, 8b, 8c, but instead of discrimination codes, a pointer that indicates a position where each item of information is stored can also be used. The information tables can, of course, have some other configuration.

As has been described above, the present invention stores other party station discrimination information for receiving so that there is a correspondence with the received telephone number in cases where a telephone number of a transmission destination is input and normal transmission performed. Furthermore, when there is redial transmission, the facsimile apparatus of the present invention displays the stored other party discrimination information on the display apparatus. Because of this, the task of selecting the other party destination is simplified for the operator.

In addition, the present invention stores pairs of telephone numbers transmitted by the other party, and apparatus performance information of the other party apparatus, as judged by the transmission control procedures when there is normal transmission so that when redial transmission takes place transmission is performed on the basis of the stored apparatus performance of the other party station. Accordingly, it is possible to shorten the transmission control procedures whereby the facsimile apparatus checks the apparatus performance of the other party station.

The present invention is not limited to the above described embodiments, and variations may be made without departing from the scop of the invention.

What is claimed is:

1. A facsimile apparatus comprising;
   input means for inputting a telephone number of a transmission destination;
   transmission means for transmitting a data signal to said transmission destination of said telephone number input by said input means;
   receiving means for receiving procedure signals having a discrimination information of said transmission destination through transmission control procedures with said transmission destination;
   redialing information storage means for storing, in correspondence with said telephone number, said discrimination information which has been received from said transmission destination each time of transmission;
   display means for displaying said discrimination information stored by said redialing information storage means;

redial selecting means for selecting one out of a plurality of said discrimination informations displayed on said display means;

redialing transmission means for transmitting said data signal to said transmission destination corresponding to said discrimination information selected by said redial selecting means.

2. A facsimile apparatus as claimed in claim 1, wherein said display means comprises;
- a redialing key which is pressed repeatedly until the required transmission destination is displayed; and
- a start key which is pressed when said required transmission destination is displayed.

3. A facsimile apparatus as claimed in claim 1, wherein said redialing information storage means includes;
- a first table in which said telephone numbers and said discrimination information corresponding to a discrimination code are stored;
- a second table in which an order of said discrimination codes and said telephone numbers read out from said first table are set; and
- a third table in which said telephone number and said discrimination code are set when said redial transmission means is operated.

4. A facsimile apparatus as claimed in claim 3, wherein said first table has a telephone number corresponding to an oldest discrimination code which was input first time by said input means, is erased when next telephone number is inputted by said telephone number input means.

5. A facsimile apparatus as claimed in claim 3, wherein said discrimination code of said third table is rewritten to other code when said oldest discrimination code was erased.

6. A facsimile apparatus as claimed in claim 3, wherein said telephone number and said discrimination code of said third table are erased when transmission was normally ended.

7. A facsimile apparatus as claimed in claim 3, wherein said discrimination code of said second table is changed order such that a lowest priority code is shifted to a highest priority code in said second table.

8. A facsimile apparatus as claimed in claim 7, wherein said discrimination code in said second table which corresponds to said highest code is erased when an input telephone number is not already stored in said first table.

9. A facsimile apparatus comprising:
- input means for inputting a telephone number of a transmission destination;
- transmission means for transmitting a data signal to said transmission destination of said telephone number input by said input means;
- performance judgment means for judging an apparatus performance of said transmission destination through transmission control procedures with said transmission destination;
- redialing information storage means for storing, in correspondence with said telephone number, a plurality of discrimination information which has been received from the transmission destination each time of transmission;
- display means for displaying said discrimination information stored by said redialing information storage means;
- redial selecting means for selecting out one of a plurality of said discrimination information displayed in said display means;
- redialing transmission means for transmitting said data to said transmission destination corresponding to said discrimination information selected by said redial selecting means;
- means for performing an abbreviated protocol for transmitting said data signal to said transmission destination without performing transmission control procedures for checking an apparatus performance information of said transmission destination stored in said redialing information storage means.

10. A facsimile apparatus as claimed in claim 9, wherein said transmission destination performance judgement means judges a transmission destination performance by using performance information signals from said transmission destination.

* * * * *